(12) United States Patent
Norby et al.

(10) Patent No.: US 11,301,784 B2
(45) Date of Patent: Apr. 12, 2022

(54) MANAGING RETAIL USING A MANAGED RETAIL RENTAL SERVICE

(71) Applicant: b8ta, inc., San Mateo, CA (US)

(72) Inventors: Vibhu Norby, Mountain View, CA (US); William Mintun, Aptos, CA (US); Phillip Raub, San Francisco, CA (US); Nicholas Mann, San Jose, CA (US)

(73) Assignee: Sol Stores, Inc., San Jose, CA (US)

( * ) Notice: Subject to any disclaimer, the term of this patent is extended or adjusted under 35 U.S.C. 154(b) by 614 days.

(21) Appl. No.: 14/875,415

(22) Filed: Oct. 5, 2015

(65) Prior Publication Data
US 2017/0098175 A1    Apr. 6, 2017

(51) Int. Cl.
*G06Q 10/02* (2012.01)
*G06Q 10/06* (2012.01)
*G06Q 30/06* (2012.01)
*G06Q 50/16* (2012.01)

(52) U.S. Cl.
CPC ......... *G06Q 10/02* (2013.01); *G06Q 10/0631* (2013.01); *G06Q 30/0645* (2013.01); *G06Q 50/16* (2013.01)

(58) Field of Classification Search
CPC .................................................... G06Q 10/02
See application file for complete search history.

(56) References Cited

U.S. PATENT DOCUMENTS

| | | | | |
|---|---|---|---|---|
| 8,041,737 B2 * | 10/2011 | Silverman | ............. | G06Q 10/10 707/784 |
| 8,325,036 B1 * | 12/2012 | Fuhr | .................... | G06Q 10/087 340/5.92 |
| 8,706,604 B1 * | 4/2014 | Topitzer | ............. | G06Q 30/0645 705/37 |
| 8,719,175 B2 * | 5/2014 | Walker | ................... | G06Q 50/16 705/313 |
| 9,524,482 B2 * | 12/2016 | Yopp | .................... | G06Q 10/067 |
| 2001/0037273 A1 * | 11/2001 | Greenlee, Jr. | .......... | G06Q 10/10 705/35 |
| 2002/0010655 A1 | 1/2002 | Kjallstrom | | |

(Continued)

FOREIGN PATENT DOCUMENTS

WO    WO-2006135976 A1 * 12/2006   ....... G06Q 10/06311

OTHER PUBLICATIONS

International Application No. PCT/US2016/055124, International Search Report and Written Opinion dated Dec. 23, 2016.

(Continued)

*Primary Examiner* — Tonya Joseph
(74) *Attorney, Agent, or Firm* — Ahmann Kloke LLP

(57) ABSTRACT

Methods and systems facilitate managing retail facilities using a managed retail rental service. A physical facility for retail rental may be identified. Configuration instructions to configure the physical facility for a specific retail use in accordance with specific configuration parameters may be received from a retail portal. The configuration instructions may be processed into facility modification instructions that direct one or more facility operators affiliated with the physical facility to modify an attribute of the physical facility. The facility modification instructions may be provided to one or more facility operations devices to configure the facility according to the specific configuration parameters.

6 Claims, 9 Drawing Sheets

(56) References Cited

U.S. PATENT DOCUMENTS

| | | | |
|---|---|---|---|
| 2003/0078897 A1* | 4/2003 | Florance | G06Q 10/087 705/80 |
| 2005/0012613 A1* | 1/2005 | Eckstein | G06K 7/0008 340/539.13 |
| 2005/0203790 A1 | 9/2005 | Cohen | |
| 2005/0222861 A1* | 10/2005 | Silverman | G06Q 10/10 705/307 |
| 2007/0288296 A1 | 12/2007 | Lewis | |
| 2008/0071562 A1* | 3/2008 | Clemenson | G06Q 10/06 705/7.12 |
| 2009/0009340 A1 | 1/2009 | Weaver et al. | |
| 2011/0173088 A1 | 7/2011 | Stone | |
| 2013/0039543 A1 | 2/2013 | Fuhr | |
| 2013/0054310 A1 | 2/2013 | Sickenius | |
| 2015/0161137 A1* | 6/2015 | Lashina | G06F 17/3053 707/749 |

OTHER PUBLICATIONS

European Patent Application No. 16854132.4, Examination Report dated Dec. 18, 2020.

* cited by examiner

MANAGING RETAIL USING A MANAGED RETAIL RENTAL SERVICE

BACKGROUND

The process of finding rental properties for retail use has never been efficient, cost-effective, or easy. Retailers seeking rental properties may have to search through listings for properties that are located in appropriate areas and/or are configured for the retailers (e.g., have appropriate layouts, fixtures, storage areas, branding, etc. for the retailers' purposes). Retailers may also have to perform extensive market research about a property, and may have to hire interior designers, contractors, engineers, brand managers, and others to configure the rental property for retail use. Retailers may also have to stock the rental property with items to sell, physically modify the look and feel of the rental property to reflect the retailers' brand, and hire and/or manage personal who oversee the operations of the rental property.

Unfortunately, many retailers do not have the time or expertise to configure a rental property for retail use. As an example, founders of an early-stage company may seek a brick-and-mortar location for a new product, but may lack the time or expertise to setup or manage a retail location. As another example, a maker of a seasonal product may find it impractical to configure a rental property for retail use if they will not use the rental property year-round or may find the conventional lease terms of many property rental systems too restricting or out of line with their need to sell a product for only a limited time each year. Systems and method that provide retailers more flexibility in selecting and configuring rental properties would be desirable.

DETAILED DESCRIPTION

Figure 1:
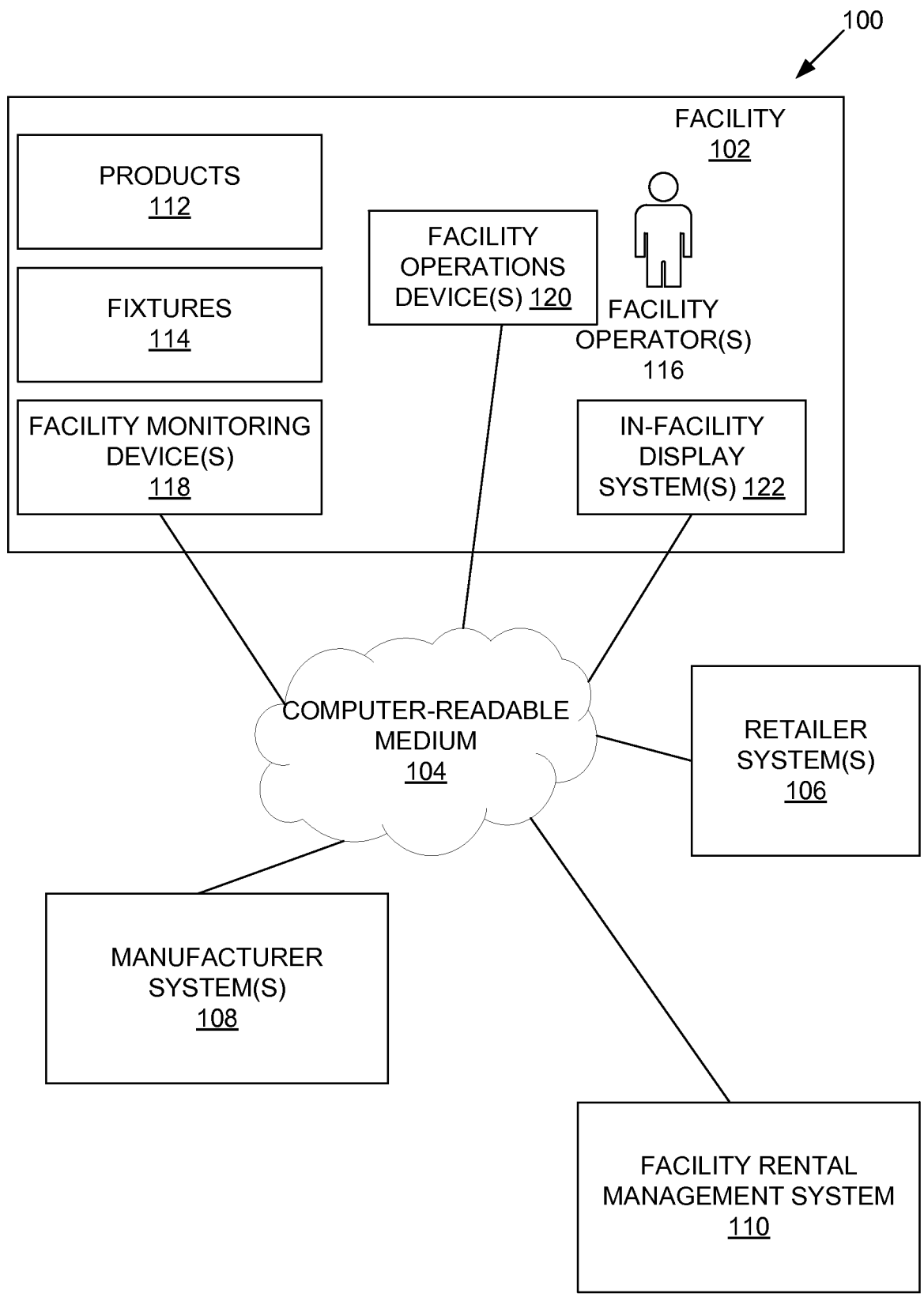
FIG. 1 depicts a diagram showing an example of a retail rental management system, in accordance with some implementations.

FIG. 1 depicts a diagram 100 showing an example of a retail rental management system, in accordance with some implementations. The retail rental management system 100 includes a facility 102, a computer-readable medium (CRM) 104, one or more retailer systems 106, one or more manufacturer systems 108, and a facility rental management system 110.

In the example of FIG. 1, the facility 102 includes products 112, fixtures 114, facility one or more operators 116, one or more facility monitoring device) 118, one or more facility operations devices 120, and one or more in-facility display systems 122.

In the example of FIG. 1, the retailer systems 106, the manufacturer systems 108, the facility rental management system 110, the facility monitoring devices 118, the facility operations devices 118, the facility operations devices 120, and the in-facility display systems 122 are coupled to the computer-readable medium 104.

Example of Retail Rental Management System.

In a specific implementation, the facility 102 includes a physical facility. A "physical facility," as used herein, may refer to any area that can be configured to support retail activity. "Retail activity," as used herein, may refer to the transfer of items in a "brick-and-mortar" location for consideration. Retail activity may include sale of items, barter of items, or transfer of items to customers that results in remuneration. The facility 102 can include a dedicated retail space, such as a store in a mall, shopping district, etc. In various implementations, the facility 102 includes a building, a courtyard, an event center, an airport or travel facility, or some combination thereof. The facility 102 can also include a portion of a building, a courtyard, an event center, an airport or travel facility, etc. In some implementations, the facility 102 is dedicated to a single retailer. In various implementations, the facility 102 may be shared by a plurality of retailers. For instance, a plurality of retailers, each associated with one of the retailer systems 106 may use portions of the facility 102 as retail space.

In the example of FIG. 1, the facility 102 includes the products 112, the fixtures 114, the facility operators 116, the facility monitoring devices 118, the facility operations devices 120, and the in-facility display systems 122. In a specific implementation, the products 112 include items for sale in the facility 102. The products 112 may include retail items, such as clothing, books, toys, sporting goods, food, consumer electronics, etc. The products 112 may be positioned on the fixtures 114 and/or unattached furniture (not shown), as discussed further herein. In a specific implementation, the products 112 are configured using a managed retail rental service supported by the facility rental management system 110. For example, the products 112 may be configured according to instructions a retailer provides to the facility rental management system 110 through the retailer systems 106. As another example, the products 112 may be configured according to one or more predefined configurations provided by the facility rental management system 110. In these implementations, the predefined configurations may be selected by a retailer according to instructions a retailer provides to the facility rental management system 110 through the retailer systems 106.

In a specific implementation, the fixtures 114 include equipment and/or furniture that is affixed to the facility 102. The fixtures 114 may include plumbing fixtures, electrical fixtures, kitchen fixtures, light fixtures, and/or other fixtures. In a specific implementation, the fixtures 114 are configured using the managed retail rental service supported by the facility rental management system 110. For example, the fixtures 114 may be configured according to instructions a retailer provides to the facility rental management system 110 through the retailer systems 106 (e.g., instructions to reconfigure fixtures to hide or show inventory). As another example, the fixtures 114 may be configured according to one or more pre-defined configurations provided by the facility rental management system 110. In these implementations, the predefined configurations may be selected by a retailer according to instructions a retailer provides to the facility rental management system 110 through the retailer systems 106.

In a specific implementation, the facility operators 116 include one or more persons who work at the facility 102. The facility operators 116 can include employees, contactors, or other individuals at the facility 102. The facility operators 116 may manage configurations of the products 112, the fixtures 114, and/or unattached furniture within the facility 102. More specifically, in various implementations, the facility operators 116 may receive instructions (e.g., through the facility operations devices 120) to arrange the products 112, the fixtures 114, and/or unattached furniture within the facility 102 according to a particular configuration. The configuration may be specified according to instructions a retailer provides to the facility rental management system 110 through the retailer systems 106 and/or according to pre-defined configurations provided by the facility rental management system 110.

In some implementations, the facility operators 116 manage electronic devices in the facility 102, such as the facility monitoring devices 118, the facility operations devices 120, and the in-facility display systems 122. To this end, the facility operators 116 may coordinate payments for items in the facility 102 through, e.g., the in-facility display systems 122. The facility operators 116 may also perform maintenance and other tasks on one or more of the facility monitoring devices 118, the facility operations devices 120, and the in-facility display systems 122.

The facility monitoring devices 118 may comprise one or more computer systems configured to monitor the facility 102 for the presence of the absence of events. A "computer system," as used herein, may include or be implemented as a specific purpose computer system for carrying out the functionalities described in this paper. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory of the computer system can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, the computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus of the computer system can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, IDSN modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. As used in this paper, an engine includes at least two components: 1) a dedicated or shared processor or a portion thereof; 2) hardware, firmware, and/or software modules executed by the processor. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the FIGS. in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud based datastore is a datastore that is compatible with cloud-based computing systems and engines.

In a specific implementation, the facility monitoring devices 118 include one or more sensors to detect activity and one or more engines responsive to the detected activity to monitor attributes of the facility 102. As an example, the facility monitoring devices 118 may include cameras, microphones, wireless signal receivers, or other sensors configured to detect activity (images, video, sounds, signals, etc.) in the relevant area of the facility 102. The sensors may be part of an inventory monitoring system that identifies inventories of the products 112, an ingress/egress monitoring system that monitors the flow of people to and from the facility 102, or other automated monitoring system. The sensors may also detect the movement of a subset of the products 112 such that the monitoring engines monitor the flow of the products 112, such as whether one or more of the products 112 are moved and/or purchased. In an implementation, at least one sensor is compatible with Prism SkyLabs® camera systems. In various implementations, the facility monitoring devices 118 are controlled by the facility rental management system 110 or through one or more systems coupled to the facility rental management system 110. As discussed herein, data from the facility monitoring devices 118 may form the basis of analytics related to the facility 102.

In a specific implementation, the facility monitoring devices 118 include sensors that capture non-visual data. As an example, the facility monitoring devices 118 may comprise a set of sensors (e.g., Radio Frequency Identification (RFID)) distributed throughout the facility 102. To continue this example, RFID tags may be affixed to a subset of the products 112 and may provide the facility rental management system 110 a stimulus when product 112 is moved and/or purchased. The RFID tags can be active (i.e., transmitters) or passive. As another example, the facility monitoring devices 118 may comprise pressure-sensitive pads affixed to one of the products 112 and may provide the facility rental management system 110 a signal when product 112 is moved and/or purchased.

In a specific implementation, the facility operations devices 120 include one or more engines configured to assist with operations inside the facility 102. In a specific implementation, at least a portion of the facility operations devices 120 includes one or more of a mobile phone, a tablet computing device, a laptop, a desktop, and a dedicated server. The facility operations devices 120 may be operated by the facility operators 116. In some implementations, the facility operations devices 120 receive instructions from the facility rental management system 110 to configure the facility 102 for a specific retail purpose. The instructions may provide the facility operators 116 with specific arrangements of the products 112, the fixtures 114, and/or unattached furniture within the facility 102. The instructions may also provide the facility operators 116 with specific locations to place the facility monitoring devices 118, the facility operations devices 120, and/or the in-facility display systems 122.

In a specific implementation, the facility operations devices 120 facilitate payments for items purchased in the facility 102. To this end, the facility operations devices 120 may receive cash, credit cards, electronic payments, digital currencies, and/or other forms of payments. The facility operations devices 120 may further provide these forms of payments to the facility rental management system 110 for reconciliation with the retailer systems 106, the manufacturer systems 108, or with other systems explicitly shown or not shown in FIG. 1.

In a specific implementation, the in-facility display systems 122 include one or more engines configured to display information related to retail activity in the facility 102. In a specific implementation, the in-facility display systems 122 are configured by the facility rental management system 110 to display promotions from a retailer and/or manufacturer. The in-facility display systems 122 may further display wait times to checkout counters, inventory of the products 112, and/or other information related to retail activity in the facility 102. In a specific implementation, the in-facility display systems 122 comprise one or more tablet computing devices that display the information discussed herein. The tablet computing device may be provided by the provider of the managed retail rental service, as discussed further herein.

The computer-readable medium 104, and other "computer-readable mediums" discussed in this paper, is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (non-volatile storage, volatile storage, etc.), but may or may not be limited to known hardware. The computer-readable medium 104 is intended to represent a variety of potentially applicable technologies. For example, the computer-readable medium 104 can be used to form a network or part of a network. Where two components are co-located on a device, the computer-readable medium 104 can include a bus or other data conduit or plane.

Where a first component is co-located on one device and a second component is located on a different device, the computer-readable medium 104 can include a computer network. More specifically, the computer-readable medium 104 may include a networked system that includes several computer systems coupled together, such as the Internet. The term "Internet" as used herein refers to a network of networks that uses certain protocols, such as the TCP/IP protocol, and possibly other protocols such as the hypertext transfer protocol (HTTP) for hypertext markup language (HTML) documents that make up the World Wide Web (the web). Content is often provided by content servers, which are referred to as being "on" the Internet. A web server, which is one type of content server, is typically at least one computer system which operates as a server computer system and is configured to operate with the protocols of the web and is coupled to the Internet. The physical connections of the Internet and the protocols and communication procedures of the Internet and the web are well known to those of skill in the relevant art. In various implementations, the computer-readable medium 104 may be implemented as a computer-readable medium, such as a bus, that couples components of a single computer together. For illustrative purposes, it is assumed the computer-readable medium 104 broadly includes, as understood from relevant context, anything from a minimalist coupling of the components illustrated in the example of FIG. 1, to every component of the Internet and networks coupled to the Internet.

In various implementations, the computer-readable medium 104 may include technologies such as Ethernet, IEEE 802.11, worldwide interoperability for microwave access (WiMAX), 3G, 4G, CDMA, GSM, LTE, digital subscriber line (DSL), etc. The computer-readable medium 104 may further include networking protocols such as multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the computer-readable medium 104 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In a specific implementation, the retailer systems 106 include one or more engines configured to allow retailers to manage retail operations in the facility 102. In various implementations, the retailer systems 106 support an executable component (an application, a process, an executable portion of a web browser, etc.) that receives instructions from retailers to identify specific facilities, and to rent those specific facilities. For instance, the executable component in the retailer systems 106 may receive specific locations, timelines, and budgets from retailers for facility rentals. Moreover, the executable component in the retailer systems 106 may receive instructions from retailers to manage configurations of the products 112, the fixtures 114, and/or unattached furniture within the facility 102. As an example, the executable component in the retailer systems 106 may receive instructions from retailers to show or hide specific ones of the products 112, or place the fixtures 114 and/or unattached furniture within the facility 102 at specified locations in the facility 102.

The executable component in the retailer systems 106 may receive instructions from retailers to manage configurations of the facility monitoring devices 118, the facility operations devices 120, and/or the in-facility display systems 122. In some implementations, the executable component in the retailer systems 106 may provide retailers with updates about the inventory of the products 112, and/or payments for products 112 that have been purchased at the facility 102. The retailer systems 106 may further provide retailers with analytics about the types of products being purchased in the facility 102, the types of customers travelling to and from the facility 102, and other measures of demand for the products 112. In a specific implementation, the retailer systems 106 are managed by the facility rental management system 110.

In a specific implementation, the manufacturer systems 110 include one or more engines configured to provide manufacturers of the products 112 with access to the retail operations of the facility 102. In various implementations, the manufacturer systems 110 may provide manufacturers of the products 112 with information related to the types of products being purchased in the facility 102, the types of customers travelling to and from the facility 102, and other measures of demand for the products 112. In a specific implementation, the manufacturer systems 108 are managed by the facility rental management system 110.

Figure 2:
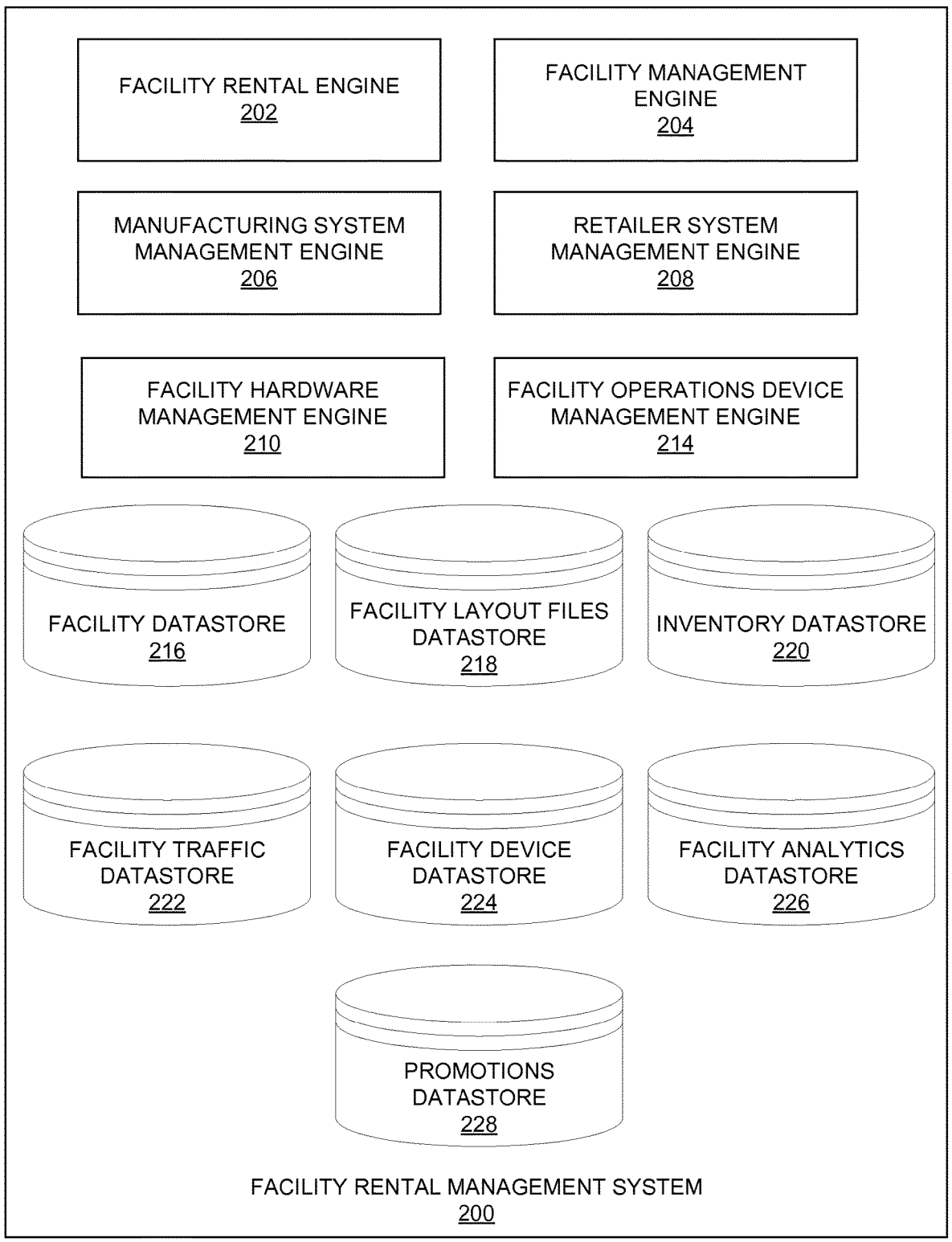
FIG. 2 depicts a diagram showing an example of a facility rental management system, in accordance with some implementations.

In a specific implementation the facility rental management system 110 includes one or more engines configured to provide a managed retail rental service to the retailer systems 106, and the manufacturer systems 108. The managed retail rental service may include engines that provide a retailer with the ability to configure, rent, and/or manage retail uses of the facility 102. FIG. 2, discussed below, shows an example of an option of how the facility rental management system 110 may be configured.

The managed retail rental service managed by the facility rental management system 110 may allow the retailer to select specific facilities using a time frame appropriate to the retailer, such as when the retailer's logistics/supply chain allows the retailer to obtain retail items. The managed retail rental service managed by the facility rental management system 110 may further allow a retailer to select fixtures and/or unattached furniture for specific retail uses of the facility. The managed retail rental service managed by the facility rental management system 110 may also provide access to facility operators that help with day-to-day operations of the facility, and engines that help with tasks the retailers may face when managing the facility, such as tasks related to monitoring facility traffic, managing inventory, facilitating payments, etc. The managed retail rental service managed by the facility rental management system 110 may further provide retailers with promotions that the retailers can use at the facility. As examples of promotions, the managed retail rental service may provide retailers with promotional campaigns the retailers can activate remotely, promotional campaigns the retailers share with other retailers, and promotional campaigns initiated by product manufacturers.

In a specific implementation, the managed retail rental service managed by the facility rental management system 110 provides retailers with a flexible pricing model. In some implementations, the flexible pricing model comprises a subscription-based pricing model that allows retailers to access, configure, and manage the facility for a subscription price. In various implementations, the subscription price comprises a flat fee for a specified period (e.g., a day, a week, a month, etc.), a fee for a specified number of items the retailer has sold at the facility, or some other fee arrangement. The subscription price may depend on the extent a retailer relies on the managed retail rental service managed by the facility rental management system 110 for promotions and/or other marketing. For instance, the subscription price may reflect sales, traffic, or promotions brought in by the managed retail rental service managed by the facility rental management system 110. As a result, in various implementations, the managed retail rental service managed by the facility rental management system 110 may provide retailers with the ability to effectively market items sold in the facility 102 without developing the time and/or expertise required to develop sophisticated marketing techniques.

In some implementations, the managed retail rental service managed by the facility rental management system 110 supports a retail portal on the retailer systems 106. The retailer portal may allow the retailers to control how furniture, fixtures, and other items in the facility are configured and/or purposed. The retailer portal may also allow retailers to receive payments for purchased items, control payment processes, and/or receive rental analytics related to the types of items being purchased at the facility. The retailer portal may further allow retailers to initiate and/or manage promotions. In an implementation, the retailer portal may allow the retailer systems 106 to initiate promotions with a single user interface action, such as a single click of a button displayed in the retailer portal. In some implementations, the managed retail rental service managed by the facility rental management system 110 provides the retailer systems 106 with of the types of items being sold at the facility 102, the traffic at the facility 102, information related to customers and/or visitors of the facility 102, and other measures of demand for a retailer's products. The managed retail rental service managed by the facility rental management system 110 may further provide the retailer systems 106 with analysis of quality measures of the facility, including, but not limited to: Key Performance Indicators (KPI) and measures of Vendor Managed Inventory (VMI). In a specific implementation, the managed retail rental service managed by the facility rental management system 110 provides the retailer systems 106 with sentient analysis from customers, such as whether customers liked inventory and/or attributes of a facility's layout, and why they felt the way they did.

In a specific implementation, the managed retail rental service managed by the facility rental management system 110 interfaces with the manufacturer systems 108. The managed retail rental service managed by the facility rental management system 110 may allow the manufacturer systems 110 to receive rental analytics related to the types of items being sold in the facility 102, the traffic at the facility 102, information related to customers and/or visitors of the facility 102, and other measures of demand for manufactured products. The managed retail rental service managed by the facility rental management system 110 may allow manufacturers to initiate and/or manage promotions. As an example, in some implementations, the managed retail rental service may allow manufacturers to provide electronic messages related to promotions on digital devices the managed retail rental service maintains in the facility. As another example, in some implementations, the managed retail rental service may allow the facility operators 116 to communicate with the manufacturer systems 108 in order to obtain information about inventory, provide rental analytics, etc.

FIG. 2 depicts a diagram 200 showing an example of a facility rental management system, in accordance with some implementations. The retail rental management system of FIG. 2 includes a facility rental engine 202, a facility management engine 204, a manufacturing system management engine 206, a retailer system management engine 208, a facility hardware management engine 210, a facility operations device management engine 214, a facility datastore 216, a facility layout files datastore 218, an inventory datastore 220, a facility traffic datastore 222, a facility device datastore 224, a facility analytics datastore 226, and a promotions datastore 228. The engines and datastores illustrated in FIG. 2 are conceptual in the sense individual engines or datastores may be operationally connected via a computer readable medium or may be physically intertwined, such as in the case of datastores with shared fields or records.

Examples of Engines and/or Datastores in Facility Rental Management System.

In a specific implementation, the facility rental engine 202 is configured to facilitate rental of one or more facilities. In various implementations, the facility rental engine 202 may be configured to gather information about facilities that can be rented. More specifically, the facility rental engine 202 may be configured to gather facility geodata from the facility datastore 216. The facility geodata may provide relevant locations of the one or more facilities to retailers for rental. Moreover, in some implementations, the facility rental engine 202 may be configured to gather facility layout data from the facility layout files datastore 218. The facility layout data may include information related to locations of products, fixtures, and/or unattached furniture within one or more facilities. In a specific implementation, the facility rental engine 202 may be configured to gather facility traffic data from the facility traffic datastore 222. The facility rental engine 202 may be configured to provide to retailers the information about facilities.

In a specific implementation, the facility management engine 204 is configured to manage attributes of one or more facilities. In some implementations, the facility management engine 204 processes instructions from retailers to modify the layout of facilities and/or items within facilities. The facility management engine 204 may, for instance, process instructions to modify facility layouts, by adding/changing walls, and/or locations of products, fixtures, and/or unattached furniture within a given facility. The facility management engine 204 may store modifications to facility layouts in the facility layout files datastore 218. The facility management engine 204 may further process instructions from retailers to modify inventory in a facility, such as the number and/or types of products within a facility. The facility management engine 204 may store information related to new and/or modified inventory in the inventory datastore 220.

In a specific implementation, the manufacturing system management engine 206 is configured to interface with manufacturing systems. An example of manufacturer systems the manufacturing system management engine 206 may be configured to interface with includes the manufacturer systems 108, shown in FIG. 1. In various implementations, the manufacturing system management engine 206 incorporates Application Programming Interfaces (APIs) that allow the manufacturing systems to access the facility rental management system 200.

In a specific implementation, the retailer system management engine 208 is configured to interface with retailer systems. An example of retailer systems the retailer system management engine 208 may be configured to interface with includes the retailer systems 106, shown in FIG. 1. In various implementations, the retailer system management engine 208 incorporates Application Programming Interfaces (APIs) that allow the retailer systems to access the facility rental management system 200.

In a specific implementation, the facility hardware management engine 210 is configured to manage hardware within one or more facilities. In some implementations, the facility hardware management engine 210 includes APIs that control facility monitoring devices and/or in-facility display systems within a facility. Moreover, the facility hardware management engine 210 may report data obtained from hardware, statuses of hardware, and other information related to hardware to manufacturer systems and/or retailer systems.

In a specific implementation, the facility operations device management engine 214 is configured to manage facility operations devices in one or more facilities. In some implementations, the facility operations device management engine 214 includes APIs that control facility operations devices. The facility operations device management engine 214 may further include modules that support an application (e.g., a mobile application) that allows facility operations devices to receive instructions to modify fixtures, products, unattached furniture, etc. in a facility. The modules may further allow facility operations devices to receive instructions to facilitate purchases within a facility, provide facility operators with information about the facility and/or inventory in the facility, etc.

In a specific implementation, the facility datastore 216 is configured to store identifiers of one or more facilities. In some implementations, the facility datastore 216 indexes facilities by geographical information, such as Global Positioning System (GPS) coordinates, addresses, or other locational identifiers. The facility datastore 216 may be populated by a GPS system or mapping software that identifies geographical data related to facilities. The facilities identified in the facility datastore 216 may each correspond to facilities maintained by a provider of a retail rental management service. As an example, the facilities identified in the facility datastore 216 may each correspond to facilities owned, leased, managed, etc. by a provider of a retail rental management service.

In a specific implementation, the facility layout files datastore 218 is configured to store layout data related to one or more facilities. In an implementation, the layout data in the facility layout files datastore 218 comprises Computer Aided Design (CAD) files that represent the layout of facilities. The CAD files may represent locations of products, fixtures, unattached furniture, facility monitoring devices, and in-facility display systems within a given facility. The facilities for which layout data is stored in the facility layout files datastore 218 may each correspond to facilities maintained by a provider of a retail rental management service. For instance, the facilities for which layout data is stored in the facility layout files datastore 218 may each correspond to facilities owned, leased, managed, etc. by a provider of a retail rental management service.

In a specific implementation, the inventory datastore 220 is configured to store inventory data related to inventory in one or more facilities. In various implementations, the inventory datastore 220 includes files that represent inventory in the one or more facilities. The inventory may include products from one or more manufacturers or products sold by one or more retailers. As a result, in various implementations, the inventory datastore 220 is populated with data representing inventory from one or more manufacturer systems or one or more retailer systems.

In a specific implementation, the facility traffic datastore 222 is configured to store facility traffic data for one or more facilities. In various implementations, the facility traffic datastore 222 includes files that represent projections of people going into and leaving specific facilities. The files may reflect different times of day and/or different times of years. As an example, the files may reflect surges in customers at a given facility before a given holiday, and/or ebbs at the given facility after the given holiday. In some implementations, the files may reflect the foot and/or other traffic at a given location. In some implementations, the files in the facility traffic datastore 222 may represent measured traffic to and from the one or more facilities. As an example, the files in the facility traffic datastore 222 may represent measurements of ingress and/or egress patterns taken by a facility monitoring device (e.g., the facility monitoring devices 118 shown in FIG. 1).

In a specific implementation, the facility device datastore 224 is configured to store identifiers of devices, such as facility monitoring devices, facility operations devices, and in-facility display systems, in one or more facilities. In some implementations, the facility device datastore 224 stores device identifiers, such as Media Access Card (MAC) addresses of devices in the one or more facilities. Moreover, in various implementations, the facility device datastore 224 may store configuration information, including Internet Protocol (IP) addresses, and/or other configuration information, of devices in one or more facilities.

In a specific implementation, the facility analytics datastore 226 is configured to store information related to rental analytics in one or more facilities. In a specific implementation, the facility analytics datastore 226 stores analytics about the types of products being purchased in one or more facilities, the types of customers travelling to and from one or more facilities, and other measures of demand for the products sold in one or more facilities. In some implementations, the rental analytics comprise Key Performance Indicators (KPI) related to the performance of one or more facilities. Moreover, in some implementations, the rental analytics comprise measures of Vendor Managed Inventory (VMI) related to one or more manufacturers.

In a specific implementation, the promotions datastore 228 is configured to store promotions data related to promotions in one or more facilities. The promotions data may include information related to coupons, advertisements, offers, inducements to purchase products, etc. In various implementations, the promotions are provided by manufacturer systems and/or retailer systems. For example, in some implementations, manufacturers may store promotions in the promotions datastore 228 using manufacturer systems. As another example, retailers may store promotions in the promotions datastore 228 using retailer systems (e.g., a retailer portal on a retailer system).

The Facility Rental Management System in Operation.

The example of FIG. 2 is intended to illustrate an example of a system that, in operation, provides retailer systems and/or manufacturer systems with a managed retail rental service.

In a specific implementation, the facility rental engine 202 operates to coordinate renting facilities to retailers. More specifically, the retailer system management engine 208 may receive instructions from a retailer to identify facility criteria related to facilities for rental. The instructions may specify facility locations, facility layouts, facility traffic, facility devices, and other information a retailer finds relevant to the facility the retailer desires to rent. The facility rental engine 202 may identify facility geodata from the facility datastore 216, facility layouts from the facility layout files datastore 218, facility traffic from the facility traffic datastore 222, and/or facility devices from the facility device datastore 224 that are similar to the facility criteria specified in the instructions. The facility rental engine 202 may further provide the retailer systems with one or more facilities that are similar to the specified facility criteria. In various implementations, the facility rental engine 202 processed selections of specific facilities that retailers want to configure for retail uses. The selections may be received by the retailer system management engine 208, for instance. The facility rental engine 202 may coordinate rental of selected properties by, e.g., forming a rental agreement, having a retailer and a landlord agree to the terms of the rental agreement, and taking payment from the retailer for portions of the lease term, such as a rental deposit and/or rent for one or more months.

In a specific implementation, the facility management engine 204 operates to allow retailers to manage one or more facilities that the retailers have agreed to rent. As an example, the retailer system management engine 208 may receive instructions from retailers to modify a layout of one or more facilities. The facility management engine 204 may process these instructions by providing specific directions to the facility operations device management engine 214 to modify layouts of one or more facilities, as well as items within the one or more facilities. The facility management engine 204 may provide specific directions to the facility operations device management engine 214 to select, e.g., granular inventory depending on the demographics of the facility being managed to avoid slotting and/or other fees. The facility management engine 204 may instruct the facility operations device management engine 214 to tell facility operators to modify specific locations of products, fixtures, unattached furniture, etc. within one or more facilities. As another example, the retailer system management engine 208 may receive instructions to place specific products in one or more facilities. The facility management engine 204 may gather specific products available for the retailer in the inventory datastore 220 and may instruct the facility operations device management engine 214 to tell facility operators to place the listed inventory into the one or more facilities. In some implementations, the inventory datastore 220 may have been populated by instructions from the manufacturing system management engine 206.

In a specific implementation, the manufacturing system management engine 206 operates to manage manufacturer systems. In another specific implementation, the retailer system management engine 208 operates to manage retailer systems. In either case, the facility hardware management engine 210 may operate to manage facility monitoring devices within a facility and/or configure facility monitoring devices to identify customers, inventory, traffic, layouts, etc. of a relevant facility. Further, the facility operations device management engine 214 may operate to configure (e.g., provide instructions to) facility operations devices in a specific facility.

Examples of Data Flows.

Figure 3:
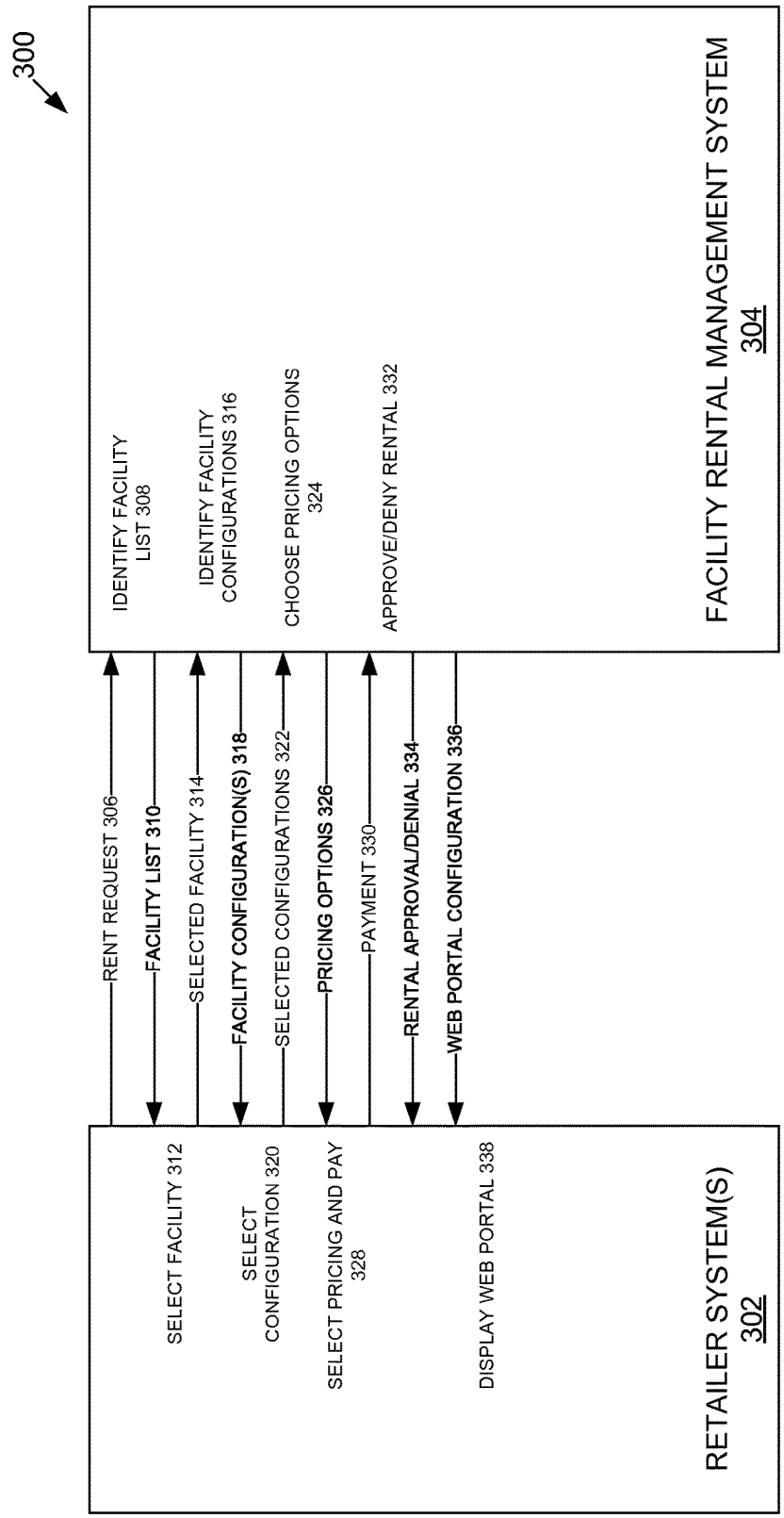
FIG. 3 depicts a diagram showing an example of a data flow of a retail rental management system configured to facilitate rental of a facility, in accordance with some implementations.

FIG. 3 depicts a diagram 300 showing an example of a data flow of a retail rental management system configured to facilitate rental of a facility, in accordance with some implementations. The diagram 300 includes retailer systems 302 and a facility rental management system 304.

In the example of FIG. 3, at an operation 306, the retailer systems 302 provides a request to rent a facility to the facility rental management system 304. At an operation 308, the facility rental management system 304 identifies a facility list based on one or more criteria, such as locations, layouts, available inventories, etc. At an operation 310, the facility rental management system 304 provides a facility list to the retailer systems 302. At an operation 312, the retailer systems 302 receive a selection of a facility form the facility list from one or more retailers operating the retailer systems 302. At an operation 314, the retailer systems 302 provide an identifier corresponding to the selected facility to the facility rental management system 304. At an operation 316, the facility rental management system 304 identifies facility configurations for the facility that has been selected. At an operation 318, the facility rental management system 304 provides the facility configurations to the retailer systems 302. At an operation 320, the retailer systems 302 receive a selected configuration for the facility. Examples of items that may be selected include layouts of products, fixtures, unattached furniture, etc.

Continuing the example of FIG. 3, at an operation 322, the retailer systems 302 provide selected configurations to the facility rental management system 304. At an operation 324, the facility rental management system 304 chooses one or more pricing options for the selected configuration. At an operation 326, the facility rental management system 304 provides the pricing options to the retailer systems 302. At an operation 328, the retailer systems 302 receive selections of pricing options and receive payment based on those pricing options. At an operation 330, the retailer systems 302 provide payment for the facility to the facility rental management system 304. At an operation 332, the facility rental management system 304 approves or denies the payment. At an operation 334, the facility rental management system 304 provides the rental approval or rental denial to the retailer systems 302. At an operation 336, the facility rental management system 304 provides instructions to configure a web portal supported by the retailer systems 302. At an operation 338, the retailer systems 302 display the configured web portal.

Figure 4:
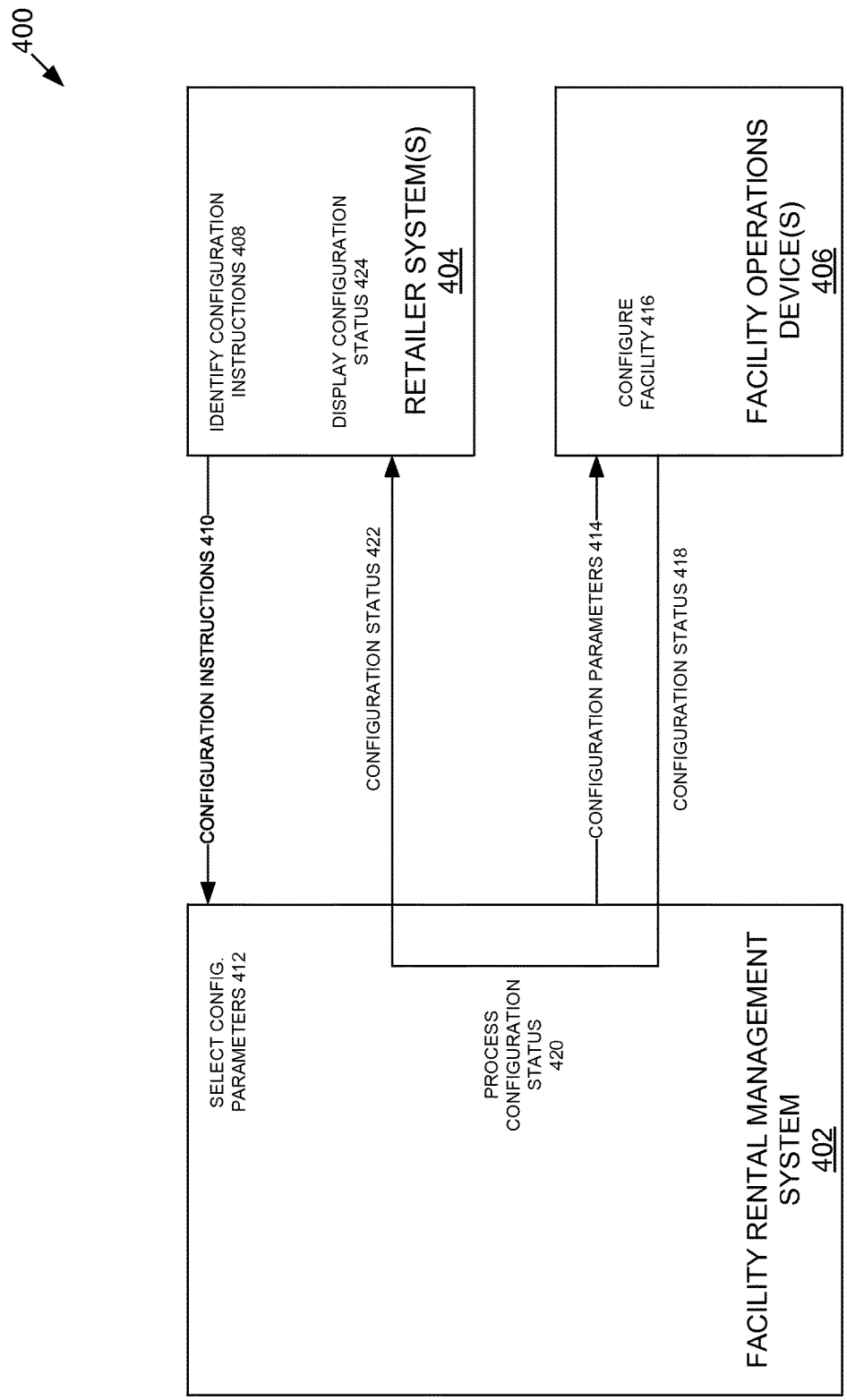
FIG. 4 depicts a diagram showing an example of a data flow of a retail rental management system configured to provide instructions to configure products and/or fixtures in a facility, in accordance with some implementations.

FIG. 4 depicts a diagram 400 showing an example of a data flow of a retail rental management system configured to provide instructions to configure products and/or fixtures in a facility, in accordance with some implementations. The diagram 400 includes a facility rental management system 402, retailer systems 404, and facility operations devices 406.

In the example of FIG. 4, at an operation 408, the retailer systems 404 identifies one or more configuration instructions for a specific facility. The configuration instructions may specify locations, layouts of products, fixtures, furniture, etc., and/or other configuration information.

Continuing the example of FIG. 4, at an operation 410, the retailer systems 404 provide the configuration instructions to the facility rental management system 402. At an operation 412, the facility rental management system 402 selects configuration parameters for the facility. At an operation 414, the facility rental management system 402 provides the configuration parameters to the facility operations devices 406. At an operation 416, the facility operations devices 406 provide facility operators with instructions to configure the facility based on the configuration parameters. At an operation 418, the facility operations devices 406 provide the facility rental management system 402 with a configuration status that reflects whether the facility was configured according to the configuration parameters. At an operation 420, the facility rental management system 402 processes the configuration status. At an operation 422, the facility rental management system 402 provides the configuration status to the retailer systems 404. At an operation 424, the retailer systems 404 display the configuration status. In various implementations, the configuration status is displayed in a retailer portal supported by the retailer systems 404.

Figure 5:
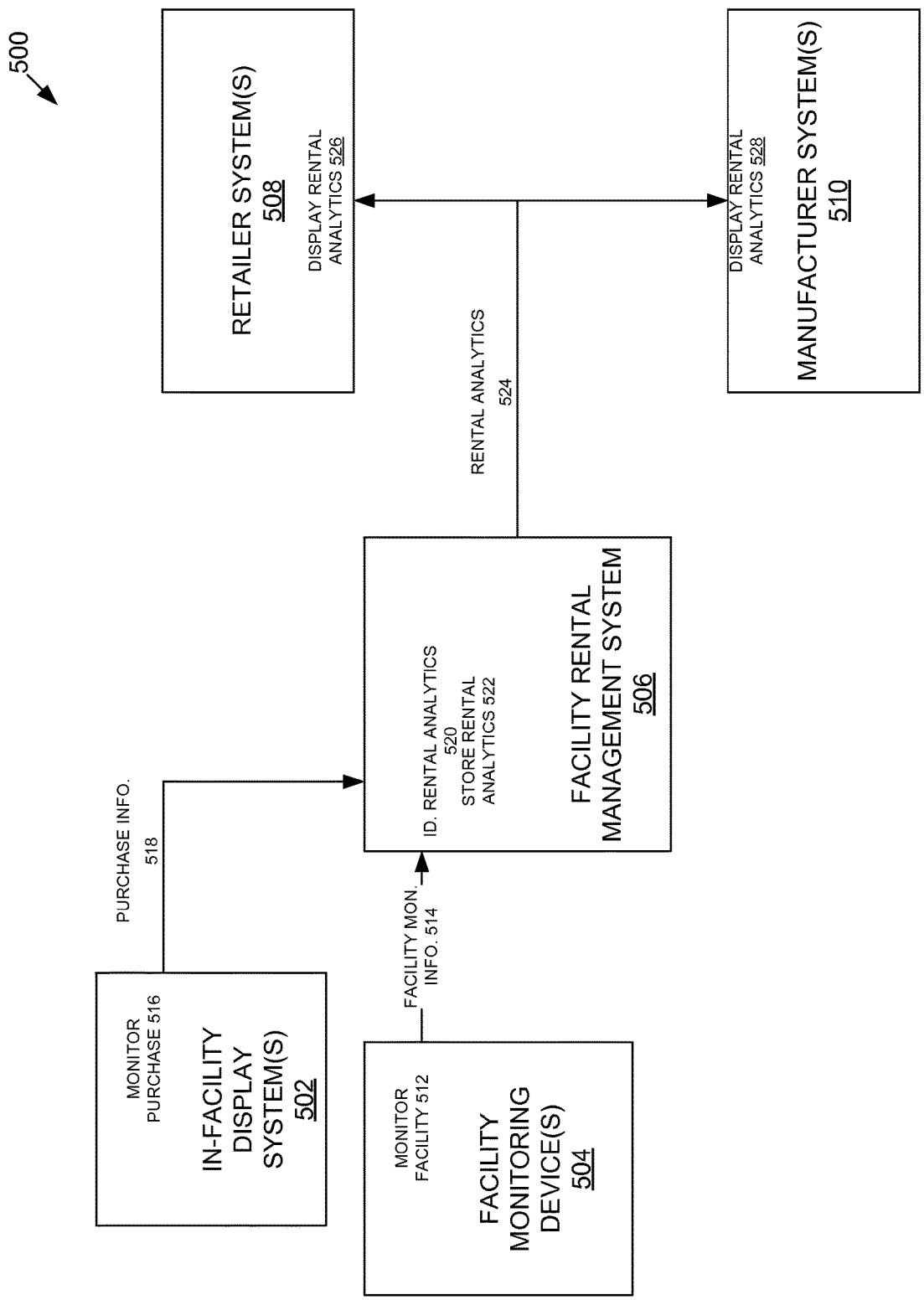
FIG. 5 depicts a diagram showing an example of a data flow of a retail rental management system configured to provide rental analytics related to a facility, in accordance with some implementations.

FIG. 5 depicts a diagram 500 showing an example of a data flow of a retail rental management system configured to provide rental analytics related to a facility, in accordance with some implementations. The diagram 500 includes in-facility displays 502, facility monitoring devices 504, a facility rental management system 506, retailer systems 508, and manufacturer systems 510.

In the example of FIG. 5, at an operation 512, the facility monitoring devices 504 monitor a facility for the presence or the absence of analytics information. In various implementations, the facility monitoring devices 504 monitor the facility for ingress and/or egress of customers, inventory and/or changes to inventory, relevant movements, etc.

Continuing the example of FIG. 5, at an operation 514, the facility monitoring devices 504 provide the analytics information to the facility rental management information. At an operation 516, the in-facility displays 516 monitor purchases in the facility. At an operation 518, the in-facility display systems 502 provide the purchase information to the facility rental management system 506. At an operation 520, the facility rental management system 506 identifies rental analytics using the analytics information from the facility monitoring devices 504 and the purchase information from the in-facility display systems 502. At an operation 522, facility rental management system 506 stores the rental analytics. At an operation 524, the facility rental management system 506 provides the rental analytics to one or more of the retail systems 508 and the manufacturer systems 510. At an operation 526, the retailer systems 508 display the rental analytics. At an operation 528, the manufacturer systems 510 display the rental analytics.

Figure 6:
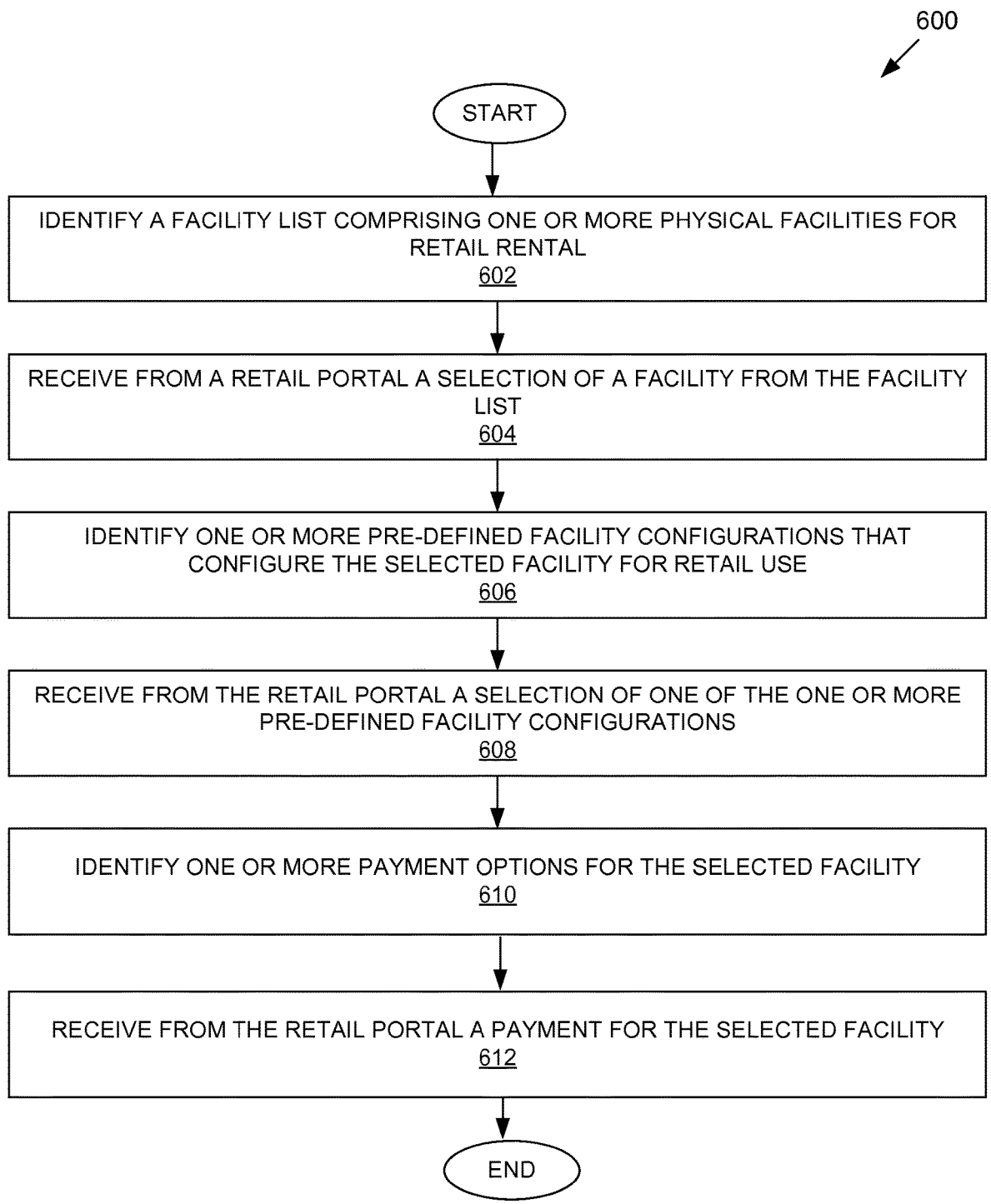
FIG. 6 depicts a flowchart of an example of a method for renting a part of a facility, in accordance with some implementations.

FIG. 6 depicts a flowchart 600 of an example of a method for renting a part of a facility, in accordance with some implementations. It is noted the flowchart 600 and other flowcharts described in this paper may implement additional or fewer modules, change the order of the modules (including the possibility of overlapping or parallel modules), and/or include alternative modules as those depicted in FIG. 6 without departing from the scope and substance of the inventive concepts described herein.

In the example of FIG. 6, at module 602, a facility list comprising one or more physical facilities for retail rental is identified. In an implementation, the facility rental engine 202 may identify a facility list of or more facilities in the facility datastore 216. The facility list may comprise facilities that have not been rented out, in whole or in part, for retail use. For instance, the facility list may comprise facilities that are available to retailers for retail use. The facility rental engine 202 provide the facility list to other engines of the facility rental management system 200, such as the retailer system management engine 208. In an implementation, the retailer system management engine 208 provides the facility list to one or more retailer systems.

In the example of FIG. 6, at module 604, a selection of a facility from the facility list is received from a retail portal. In a specific implementation, the retailer system management engine 208 may receive, over a computer-readable medium, a selection of one of the facilities in the facility list. The facility list may have been displayed in a retail portal on the retailer system that was configured to manage retail rentals for a retailer associated with the retailer system.

In the example of FIG. 6, at module 606, one or more pre-defined facility configurations that configure the selected facility for retail use are identified. In various implementations, the facility management engine 204 may identify potential pre-defined facility configurations (potential layouts, potential placement of products, fixtures, unattached furniture, etc.) related to the selected facility. The facility management engine 204 may provide the potential pre-defined facility configurations to the retailer system management engine 208, which in turn, may provide the potential pre-defined facility configurations to the retailer portal on the retailer system.

In the example of FIG. 6, at module 608, a selection of one of the one or more pre-defined facility configurations is received from the retail portal. In a specific implementation, the retailer system management engine 208 may receive, over a computer-readable medium, a selection of one of the pre-defined facility configurations. The selected pre-defined facility configuration may have been displayed in a retail portal on the retailer system that was configured to manage retail rentals for a retailer associated with the retailer system.

In the example of FIG. 6, at module 610, one or more payment options for the selected facility is identified. In some implementations, the facility rental engine 202 may identify payment options based on one or more attributes of the selected facility. For instance, the facility rental engine 202 may identify whether a landlord or agent associated with the selected facility receives payment via an electronic transfer of funds, credit card, digital currency, etc. The amount of payment may depend on the specific configuration of the selected facility that the retailer selected.

In the example of FIG. 6, at module 612, a payment for the selected facility is received from the retail portal. In a specific implementation, the retailer system management engine 208 may receive, over a computer-readable medium, payment for the selected facility. The payment may be consist with the one or more payment options for the selected facility, as described herein.

Figure 7:
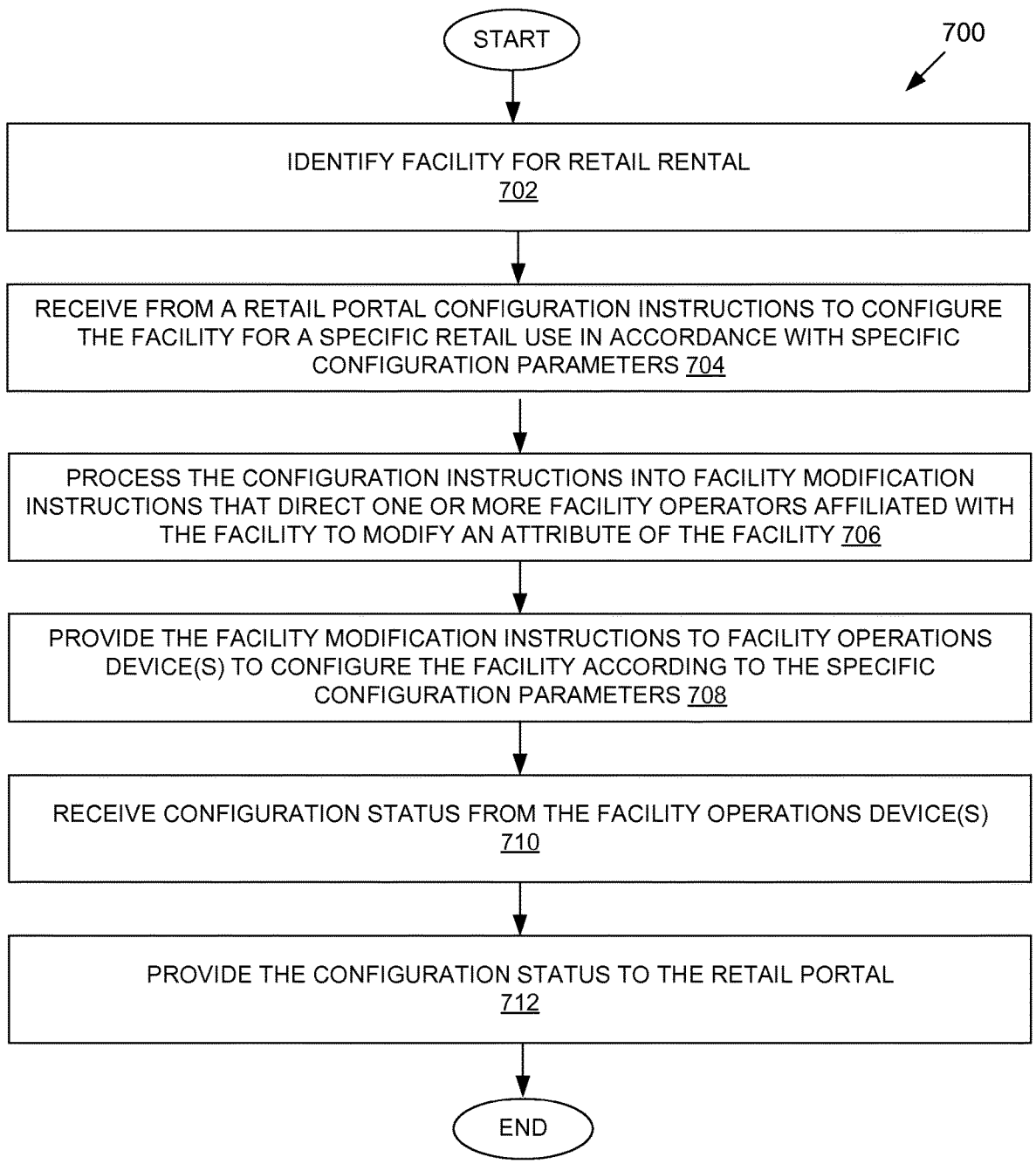
FIG. 7 depicts a flowchart of an example of a method for providing configuration parameters to a facility operations device, in accordance with some implementations.

FIG. 7 depicts a flowchart 700 of an example of a method for providing configuration parameters to a facility operations device, in accordance with some implementations. In the example of FIG. 7, at module 702, a facility is identified for retail rental. In a specific implementation, the facility management engine 204 may identify a facility that has been rented to a retailer. The facility management engine 204 may obtain an identifier of the facility from the facility datastore 216 and/or the facility rental engine 202. In some implementations, the facility may have been pre-configured for retail use using the techniques described herein.

In the example of FIG. 7, at module 704, configuration instructions to configure the facility for a specific retail use in accordance with specific configuration parameters are received from a retail portal. In some implementations, the retailer system management engine 208 may receive configuration instructions to configure the facility for a specific retail use. The retailer system management engine 208 may provide the configuration instructions to the facility management engine 204. The facility management engine 204 may obtain specific facility layouts from the facility layout files datastore 218. The facility management engine 204 may filter layouts by combinations of fixtures, products, unattached furniture, etc. that are appropriate for the retailer. The facility management engine 204 may provide information related to these layouts to the facility operations device management engine 214.

In the example of FIG. 7, at module 706, the configuration instructions are processed into facility modification instructions that direct one or more facility operators affiliated with the facility to modify an attribute of the facility. In a specific implementation, the facility management engine 204 may process the configuration instructions into facility modification instructions that direct one or more facility operators affiliated with the facility to modify an attribute of the facility.

In the example of FIG. 7, at module 708, the facility modification instructions are provided to facility operations devices to configure the facility according to the specific configuration parameters. In an implementation, the facility operations device management engine 214 may instruct facility operations devices to display configuration instructions for a facility to facility operators. The instructions may comprise directions to modify the layout, etc. of the facility.

In the example of FIG. 7, at module 710, a configuration status is received from the facility operations devices. In some implementations, the facility operations device management engine 214 may receive a configuration status about whether or not the facility was configured according to the configuration instructions and/or configuration parameters. The facility operations device management engine 214 may provide the configuration status to the other modules of the facility rental management system 200, such as the retailer system management engine 208. At an operation 712, the configuration status may be provided to the retail portal. In some implementations, the retailer system management engine 208 provides the configuration status to retailer systems.

Figure 8:
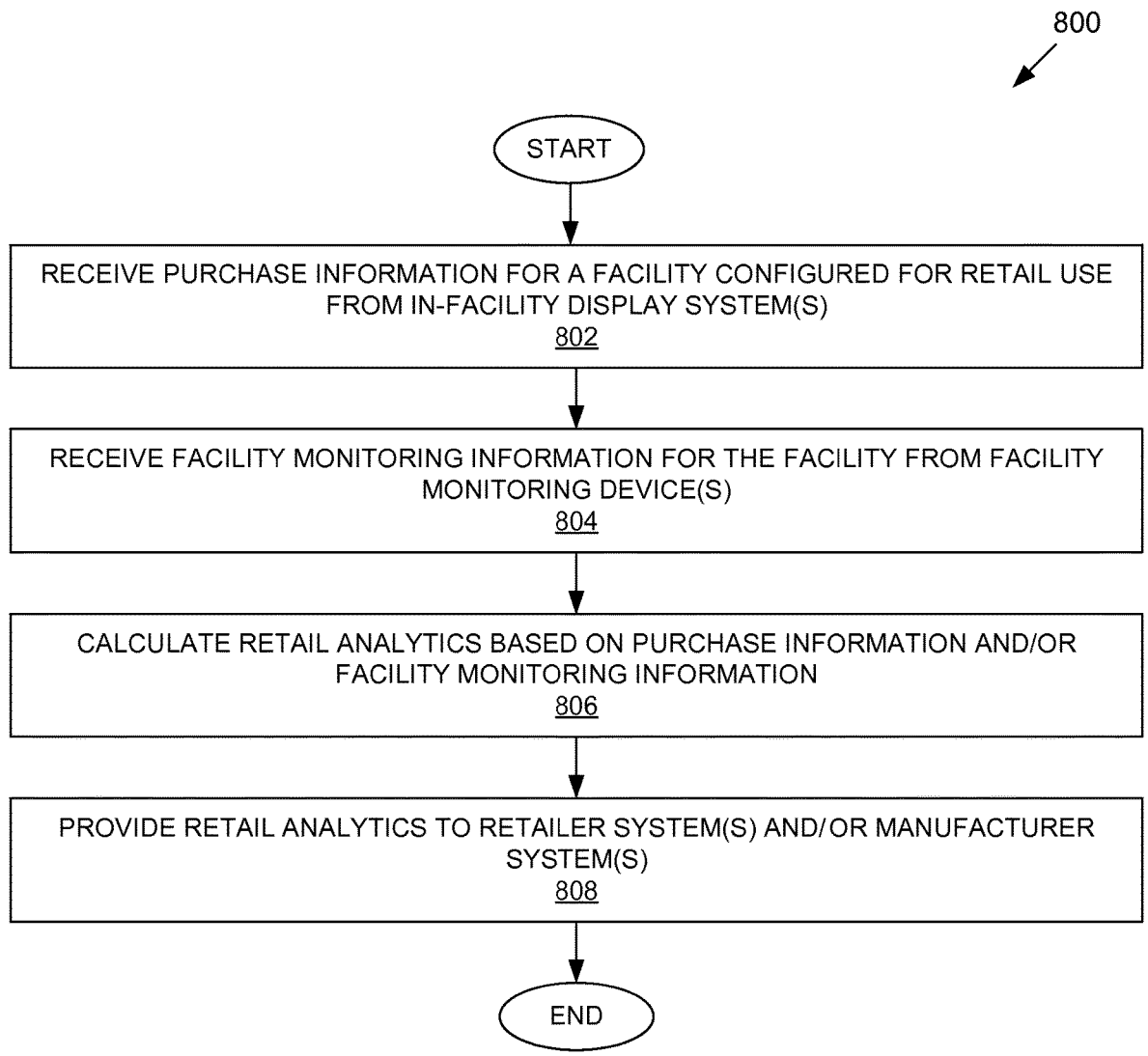
FIG. 8 depicts a flowchart of an example of a method for providing retail rental analytics to manufacturers and/or retailers, in accordance with some implementations.

FIG. 8 depicts a flowchart of an example of a method for providing retail rental analytics to manufacturers and/or retailers, in accordance with some implementations. In the example of FIG. 8, at module 802, purchase information for a facility configured for retail use is received from in-facility display systems. In a specific implementation, the facility hardware management engine 210 may receive from in-facility display systems purchase information about purchases at a facility that has been configured for retail use.

In the example of FIG. 8, at module 804, facility monitoring information for the facility is received from facility monitoring devices. In a specific implementation, the facility hardware management engine 210 may receive from facility monitoring devices facility monitoring information about customers, ingress/egress patterns, inventory, etc. about the facility.

In the example of FIG. 8, at module 806, retail analytics are calculated based on the purchase information and/or the facility monitoring information. In an implementation, the facility management engine 204 may calculate retail analytics based on the purchase information and/or the facility monitoring information obtained by the facility hardware management engine 210.

In the example of FIG. 8, at module 808, retail analytics are provided to retailer systems and/or manufacturer systems. In various implementations, the retailer system management engine 208 may provide the retail analytics to retailers and/or the manufacturing system management engine 206 may provide retail analytics to manufacturers.

Figure 9:
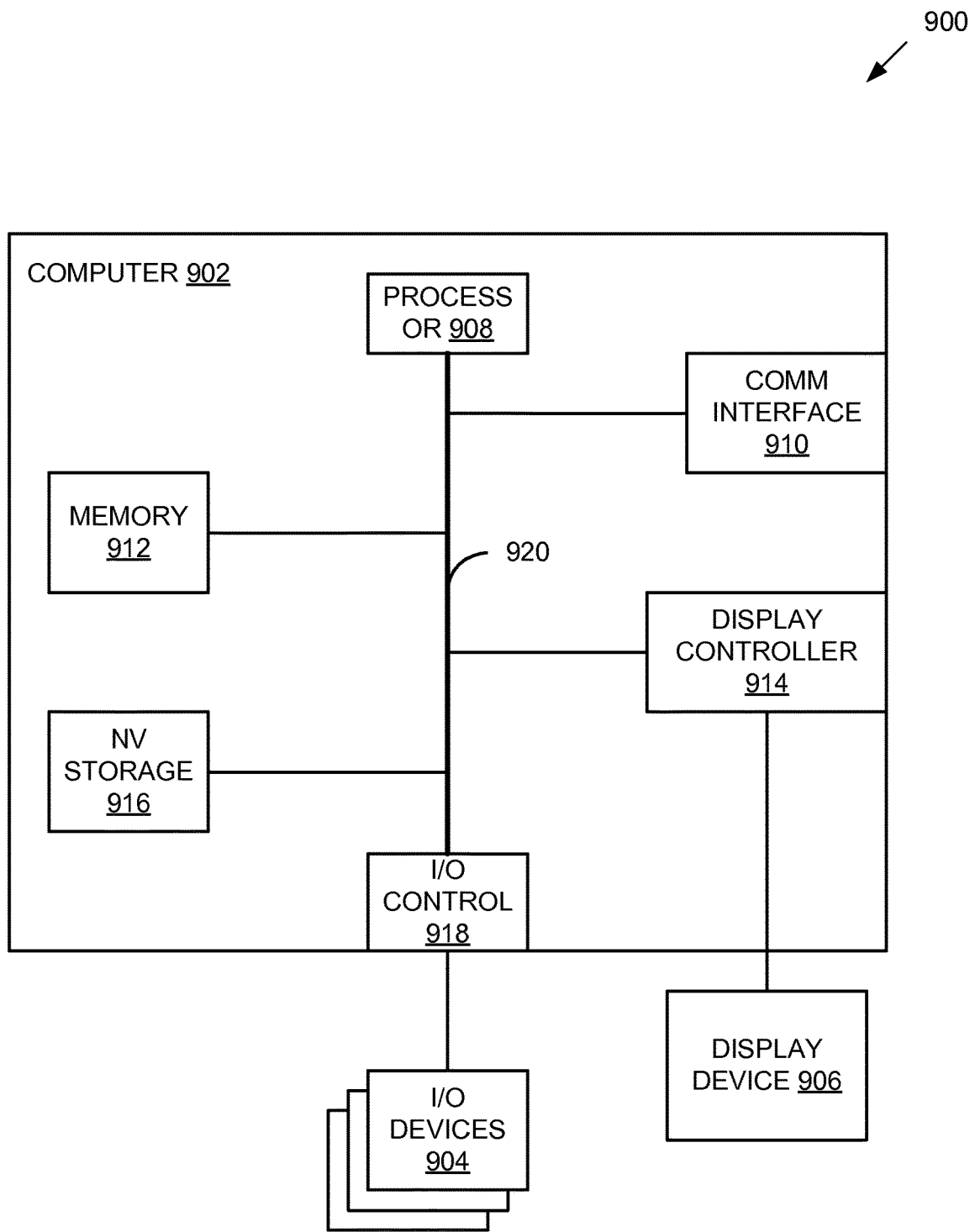
FIG. 9 depicts an example of a computer system, in accordance with some implementations.

FIG. 9 shows an example of a computer system 900, which can be incorporated into various implementations described in this paper. The example of FIG. 9, is intended to illustrate a computer system that can be used as a client computer system, such as a wireless client or a workstation, or a server computer system. In the example of FIG. 9, the computer system 900 includes a computer 902, I/O devices 904, and a display device 906. The computer 902 includes a processor 908, a communications interface 910, memory 912, display controller 914, non-volatile storage 916, and I/O controller 918. The computer 902 can be coupled to or include the I/O devices 904 and display device 906.

The computer 902 interfaces to external systems through the communications interface 910, which can include a modem or network interface. It will be appreciated that the communications interface 910 can be considered to be part of the computer system 900 or a part of the computer 902. The communications interface 910 can be an analog modem, ISDN modem, cable modem, token ring interface, satellite transmission interface (e.g. "direct PC"), or other interfaces for coupling a computer system to other computer systems.

The processor 908 can be, for example, a conventional microprocessor such as an Intel Pentium microprocessor or Motorola power PC microprocessor. The memory 912 is coupled to the processor 908 by a bus 920. The memory 912 can be Dynamic Random Access Memory (DRAM) and can also include Static RAM (SRAM). The bus 920 couples the processor 908 to the memory 912, also to the non-volatile storage 916, to the display controller 914, and to the I/O controller 918.

The I/O devices 904 can include a keyboard, disk drives, printers, a scanner, and other input and output devices, including a mouse or other pointing device. The display controller 914 can control in the conventional manner a display on the display device 906, which can be, for example, a cathode ray tube (CRT) or liquid crystal display (LCD). The display controller 914 and the I/O controller 918 can be implemented with conventional well known technology.

The non-volatile storage 916 is often a magnetic hard disk, an optical disk, or another form of storage for large amounts of data. Some of this data is often written, by a direct memory access process, into memory 912 during execution of software in the computer 902. One of skill in the art will immediately recognize that the terms "machine-readable medium" or "computer-readable medium" includes any type of storage device that is accessible by the processor 908 and also encompasses a carrier wave that encodes a data signal.

The computer system illustrated in FIG. 9 can be used to illustrate many possible computer systems with different architectures. For example, personal computers based on an Intel microprocessor often have multiple buses, one of which can be an I/O bus for the peripherals and one that directly connects the processor 908 and the memory 912 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 912 for execution by the processor 908. A Web TV system, which is known in the art, is also considered to be a computer system, but it can lack some of the features shown in FIG. 9, such as certain input or output devices. A typical computer system will usually include at least a processor, memory, and a bus coupling the memory to the processor.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Techniques described in this paper relate to apparatus for performing the operations. The apparatus can be specially constructed for the required purposes, or it can comprise a general purpose computer selectively activated or reconfigured by a computer program stored in the computer. Such a computer program can be stored in a computer readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus.

For purposes of explanation, numerous specific details are set forth in order to provide a thorough understanding of the description. It will be apparent, however, to one skilled in the art that implementations of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

The language used herein has been principally selected for readability and instructional purposes, and it may not have been selected to delineate or circumscribe the inventive subject matter. It is therefore intended that the scope be limited not by this detailed description, but rather by any claims that issue on an application based hereon. Accordingly, the disclosure of the implementations is intended to be illustrative, but not limiting, of the scope, which is set forth in the claims recited herein.

What is claimed is:

1. A system comprising:
a plurality of ingress and egress sensors, each of the of plurality of ingress and egress sensors positioned at a physical facility for detecting flow of customers to and from the physical facility and detecting ingress and egress patterns of the flow of customers;
a plurality of active radio frequency identification (RFID) sensors configured to be affixed to one or more first products in the physical facility and to track inventory and movement of the one or more first products;
a plurality of passive RFID sensors configured to be affixed to one or more second products in the physical facility and to track inventory and movement of the one or more second products;
a plurality of pressure-sensitive sensors configured to be affixed to one or more third products in the physical facility and to track inventory and movement of the one or more third products;
one or more display systems configured to capture purchase information for the one or more first products, the one or more second products, and the one or more third products;
one or more processors; and
memory storing instructions that, when executed by the one or more processors, cause the system to perform:
identifying the physical facility having space for rental by a retailer for a specific time frame for a specific retail use, the identification of the physical facility being based on one or more of a geographical location of the physical facility, a layout of the physical facility, traffic data of the physical facility, and devices located at the physical facility, the retailer being one of a plurality of retailers renting space in the physical facility for a specific time frame for a specific retail use, each of the plurality of retailers being associated with a retailer portal configured to communicate retailer-specific data over a network with a retail management entity operating the physical facility;
determining terms of the rental based on the specific time frame and the specific retail use;
provisioning the space in the physical facility for rental to the retailer on the terms based on the specific time frame and the specific retail use;
receiving from the retailer, via the retailer portal associated with the retailer, configuration instructions to configure the space in the physical facility in accordance with specific configuration parameters, the specific configuration parameters being based on the specific retail use and including parameters regarding placement of one or more of fixtures, unattached furniture, display systems, and the one or more first and second and third products within the space in the physical facility;

processing the configuration instructions into facility modification instructions for directing one or more facility operators affiliated with the physical facility to configure the space in the physical facility according to the specific configuration parameters;

providing the facility modification instructions to one or more facility operations devices of the one or more facility operators;

calculating product flow analytics for the one or more first products and the one or more second products and the one or more third products based on the plurality of ingress and egress sensors and the detected ingress and egress patterns of the flow of customers and the active RFID sensors and the plurality of passive RFID sensors and the plurality of pressure sensitive sensors and the purchase information captured by the one or more display systems, the product flow analytics including Key Performance Indicators (KPI) associated with a performance of the physical facility, and the analytics including measures of Vendor Managed Inventory (VMI) related to one or more manufacturers of the one or more first products, the one or more second products and the one or more third products in the physical facility;

providing the product flow analytics to the retailer via the retailer portal;

receiving from the retailer, via the retailer portal, further configuration instructions regarding placement of the one or more of the fixtures, the unattached furniture, the display systems, and the one or more first products, the one or more second products and the one or more third products within the space in the physical facility in response to the product flow analytics.

2. The system of claim 1, wherein the specific configuration parameters include parameters regarding a layout of the space in the physical facility.

3. The system of claim 1, wherein the specific configuration parameters include parameters regarding acceptance of payments for the one or more first and second and third products.

4. The system of claim 1, further comprising:
receiving a configuration status from the one or more facility operations devices;
providing the configuration status to the retailer via the retailer portal.

5. The system of claim 1, wherein identifying the physical facility having space for rental comprises:
gathering a facility list comprising one or more physical facilities having space for rental;
receiving from the retailer via the retailer portal a selection of the physical facility from the facility list.

6. The system of claim 1, further comprising:
identifying one or more payment options for the space in the physical facility;
receiving from the retailer via the retailer portal a payment for the space in the physical facility in accordance with the one or more payment options.

* * * * *